(12) United States Patent
Hann

(10) Patent No.: US 6,789,850 B1
(45) Date of Patent: Sep. 14, 2004

(54) HEADREST ASSEMBLY

(75) Inventor: Mark S. Hann, Shorewood, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/595,531

(22) Filed: Jun. 16, 2000

Related U.S. Application Data

(62) Division of application No. 09/435,980, filed on Nov. 8, 1999, now Pat. No. 6,224,158.

(51) Int. Cl.⁷ ................................................. A47C 1/10
(52) U.S. Cl. ...................................... 297/391; 297/410
(58) Field of Search ................................ 297/391, 350, 297/284.1, 353, 452.56, 396, 404, 410, 452.18

(56) References Cited

U.S. PATENT DOCUMENTS

| | | | | |
|---|---|---|---|---|
| 1,949,113 A | * | 2/1934 | Cox ............................ 297/350 |
| 2,577,050 A | * | 12/1951 | Van Buren ................... 297/353 |
| 4,262,918 A | * | 4/1981 | Sandino ..................... 280/11.26 |
| 4,390,209 A | * | 6/1983 | Izuno et al. ................. 297/410 |
| 4,779,928 A | | 10/1988 | Collier et al. ................ 297/391 |
| 4,989,836 A | * | 2/1991 | Hudson, III et al. ......... 297/391 |
| 5,398,996 A | * | 3/1995 | Steiner ......................... 297/391 |
| 5,405,190 A | * | 4/1995 | Jeffcoat et al. .............. 297/391 |
| 5,667,276 A | * | 9/1997 | Connelly et al. ......... 297/391 X |
| 5,713,634 A | | 2/1998 | Koike ..................... 297/378.13 |
| 5,769,499 A | * | 6/1998 | Dudash et al. ........... 297/391 X |
| 5,788,250 A | * | 8/1998 | Masters et al. .......... 297/391 X |
| 5,816,658 A | * | 10/1998 | Wallis ......................... 297/410 |
| 5,836,651 A | | 11/1998 | Szerdahelyi et al. ........ 297/410 |
| 5,895,094 A | | 4/1999 | Mori et al. .................. 297/410 |
| 5,967,612 A | * | 10/1999 | Takei .......................... 297/391 |
| 6,007,154 A | * | 12/1999 | Parker et al. ................ 297/410 |
| 6,062,645 A | * | 5/2000 | Russell ....................... 297/410 |

FOREIGN PATENT DOCUMENTS

| | | |
|---|---|---|
| EP | 0 829 390 A2 | 9/1997 |
| EP | 0 914 985 B1 | 10/1998 |
| EP | 1 055 553 A2 | 5/2000 |

* cited by examiner

Primary Examiner—Peter M. Cuomo
Assistant Examiner—Stephen Vu
(74) Attorney, Agent, or Firm—Mark W. Croll; Paul F. Donovan

(57) ABSTRACT

A headrest assembly is provided wherein a headrest guide and/or a headrest insert permit adjustment of the headrest even when one or more components of the headrest assembly are misaligned or out of tolerance. The headrest guide includes two sleeves, each sleeve forming a channel, the two sleeves rigidly connected with respect to one another so that the channel of each sleeve is parallel with the other.

9 Claims, 3 Drawing Sheets

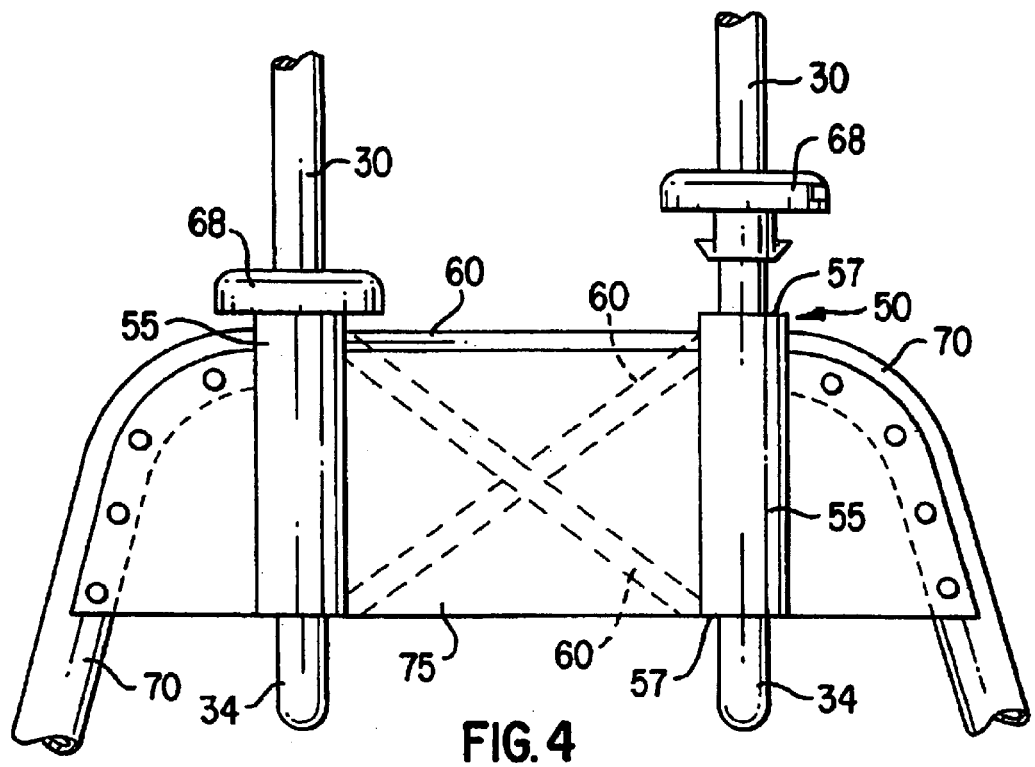
FIG. 4
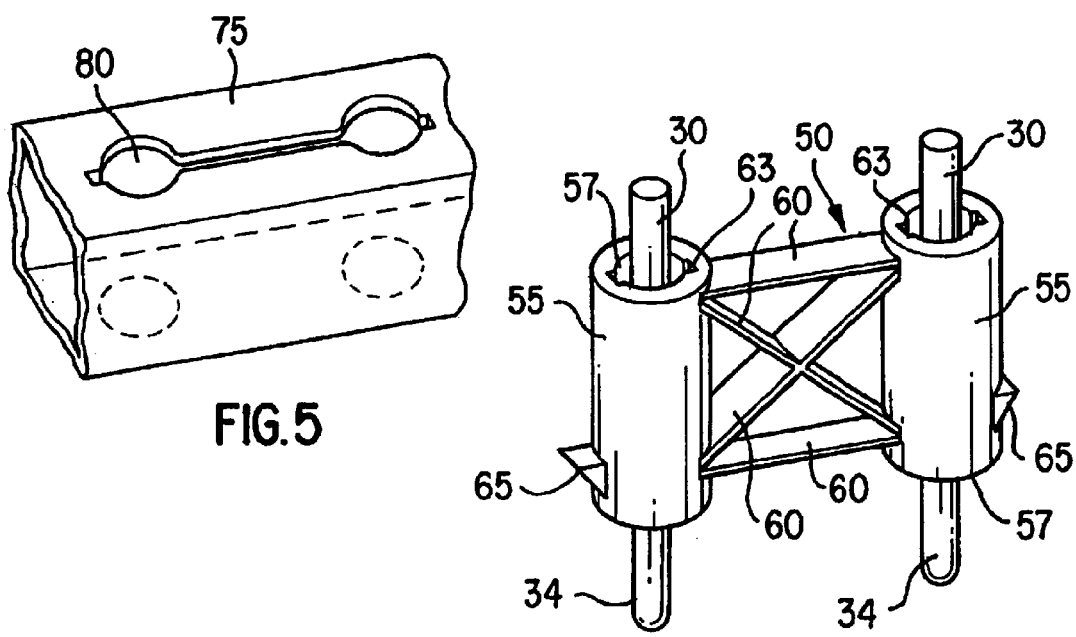
FIG. 5
FIG. 6

HEADREST ASSEMBLY

CROSS REFERENCE TO RELATED APPLICATION

This application is a divisional of patent application Ser. No. 09/435,980, filed on Nov. 8, 1999, now U.S. Pat. No. 6,224,158, issued on May 1, 2001.

BACKGROUND OF THE INVENTION

1. Field of the Invention

This invention relates to a headrest assembly including a headrest guide and/or a headrest insert for permitting the sliding movement of a vehicle headrest with minimal efforts.

2. Description of Related Art

Automobiles and other vehicles typically include headrests located on the seatbacks to support and/or brace the head and neck of the passenger. Headrests are generally adjustable to accommodate passengers of different heights and body types. An important factor in adjustability of the height of headrests are the efforts required to move the headrest between horizontal positions.

In general, headrests have support rods that are slideably adjustable within guides in the seat. If the guides or the support rods are misaligned, the efforts required to adjust the headrest significantly increase. Mori et al., U.S. Pat. No. 5,895,094, and Collier et al., U.S. Pat. No. 4,779,928, are typical of the prior art wherein a rigid cross bar is positioned between support rods within the headrest.

Wallis, U.S. Pat. No. 5,816,658, and Koike, U.S. Pat. No. 5,713,634, are typical of the prior art having two separate holders or sleeves for accepting the support rods of the headrest. The separate holders or sleeves are generally positioned within supports welded on to the seat frame. Much of the variability in conventional headrest assemblies results from the variability in the welded supports on the seat frame.

The above described arrangements may result in misalignment of the support rods and/or the holders or sleeves for accepting the support rods. When such misalignment occurs, the headrest may become difficult to slide with respect to the seat because the centerlines of the support rods are not aligned with the centerlines of the channels of the holders or sleeves accepting the support rods.

Therefore, there is a need for one or more individual components within a headrest assembly that permit self-adjusting and/or aligned sliding engagement between headrest rods and the guides for accepting the headrest rods.

SUMMARY OF THE INVENTION

A headrest assembly according to a preferred embodiment of this invention contains one or both of a headrest insert and a headrest guide. Headrest rods preferably extend between the headrest insert and the headrest guide.

The headrest insert preferably includes two receivers for accommodating the headrest rods. Each headrest rod includes a fixed end positioned within one receiver and an opposite, moveable end slideably connected with respect to the seat, such as within the headrest guide.

The two receivers on the headrest insert are independently moveable with respect to each other thereby permitting each headrest rod to find its own center when slideably engaged with respect to the seat. The headrest insert may comprise a taper, an irregular surface, a reduced thickness, a joint and/or a central transition to facilitate flexibility about a central area thereby permitting limited independent movement of the two receivers with respect to one another.

A headrest guide for accepting two headrest rods may also be used in connection with the headrest assembly of this invention. The headrest guide comprises two sleeves, each forming a central channel. A plurality of rigid struts preferably extend between the two sleeves so that centerlines of each channel are parallel with respect to one another. As a result of the struts extending between the sleeves, both sleeves should always be aligned with respect to one another.

It is one object of this invention to provide a headrest assembly wherein the headrest rods are independently moveable for sliding engagement with misaligned headrest guides.

It is another object of this invention to provide a headrest assembly wherein the headrest guides are connected with respect to each other to prevent misalignment of the headrest guides relative to one another.

It is still another object of this invention to provide a headrest having an internal headrest insert that permits movement between opposite ends of the headrest insert.

It is yet another object of this invention to provide a headrest assembly that permits sliding movement of the headrest rods with respect to the headrest guides with minimal efforts.

BRIEF DESCRIPTION OF THE DRAWINGS

The above-mentioned and other features and objects of this invention will be better understood from the following detailed description taken in conjunction with the drawings wherein:

FIG. 4 is a front view of headrest assembly according to one preferred embodiment of this invention;

FIG. 5 is a perspective front view of a guide frame according to one preferred embodiment of this invention; and FIG. 6 is a perspective front view of a headrest guide according to one preferred embodiment of this invention.

DESCRIPTION OF PREFERRED EMBODIMENTS

Figure 1:
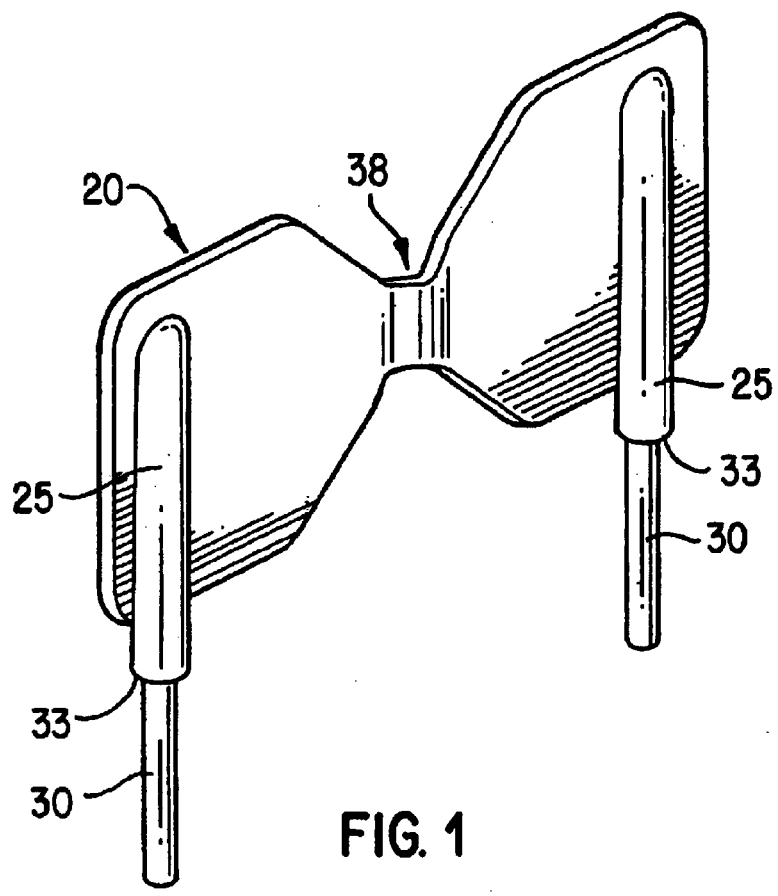
FIG. 1 is a perspective front view of a headrest insert according to one preferred embodiment of this invention.

Headrests are traditionally slideably connected with respect to a seat and typically consist of an inner frame, padding surrounding the frame, and a cover, such as upholstery, around the entire headrest. The inner frame may comprise headrest insert 20, such as shown in FIG. 1 in one preferred embodiment of this invention.

Headrest insert 20 is preferably at least partially molded from a strong, semi-rigid material such as high density polyethylene (HDPE) or other similar material known to those having ordinary skill in the art. According to one preferred embodiment of this invention, headrest insert 20 forms a generally planar, unitary surface. Cost considerations favor molding a unitary headrest insert 20 thereby eliminating the need for the fitting and assembly of multiple components.

Headrest insert 20 preferably includes two receivers 25. The receivers 25 preferably accommodate headrest rods 30.

Each headrest rod 30 preferably includes fixed end 33 positioned within one receiver 25. An opposite, moveable end 34 is preferably slideably connected with respect to the seat as described below.

According to a preferred embodiment of this invention, the two receivers 25 are independently moveable with respect to each other. Independent motion of each receiver 25 preferably permits each headrest rod 30 to find its own center when slideably engaged with respect to the seat. Therefore, if the seat or the headrest is improperly assembled, the headrest will still slide with minimal efforts with respect to the seat.

Figure 2:
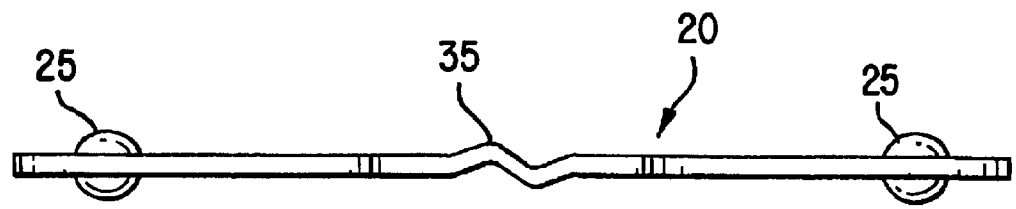
FIG. 2 is a top view of the headrest insert shown in FIG. 1.

As shown in FIGS. 1 and 2, headrest insert 20 may comprise at least one transition 35, such as a corrugation, bend or similar such irregular surface molded into an approximate center 38 headrest insert 20. In addition, and as further shown in FIGS. 1 and 3, headrest insert 20 may be tapered between the two receivers 25. Headrest insert 20 may include the irregular surface at the maximum taper between the two receivers 25. Alternatively, or in addition, headrest insert 20 may further comprise a reduced thickness between the two receivers 25. The taper, irregular surface, reduced thickness and/or transition 35 results in headrest insert 20 that is flexible about a central area thereby permitting limited independent movement of the two receivers 25 with respect to one another.

Figure 3:
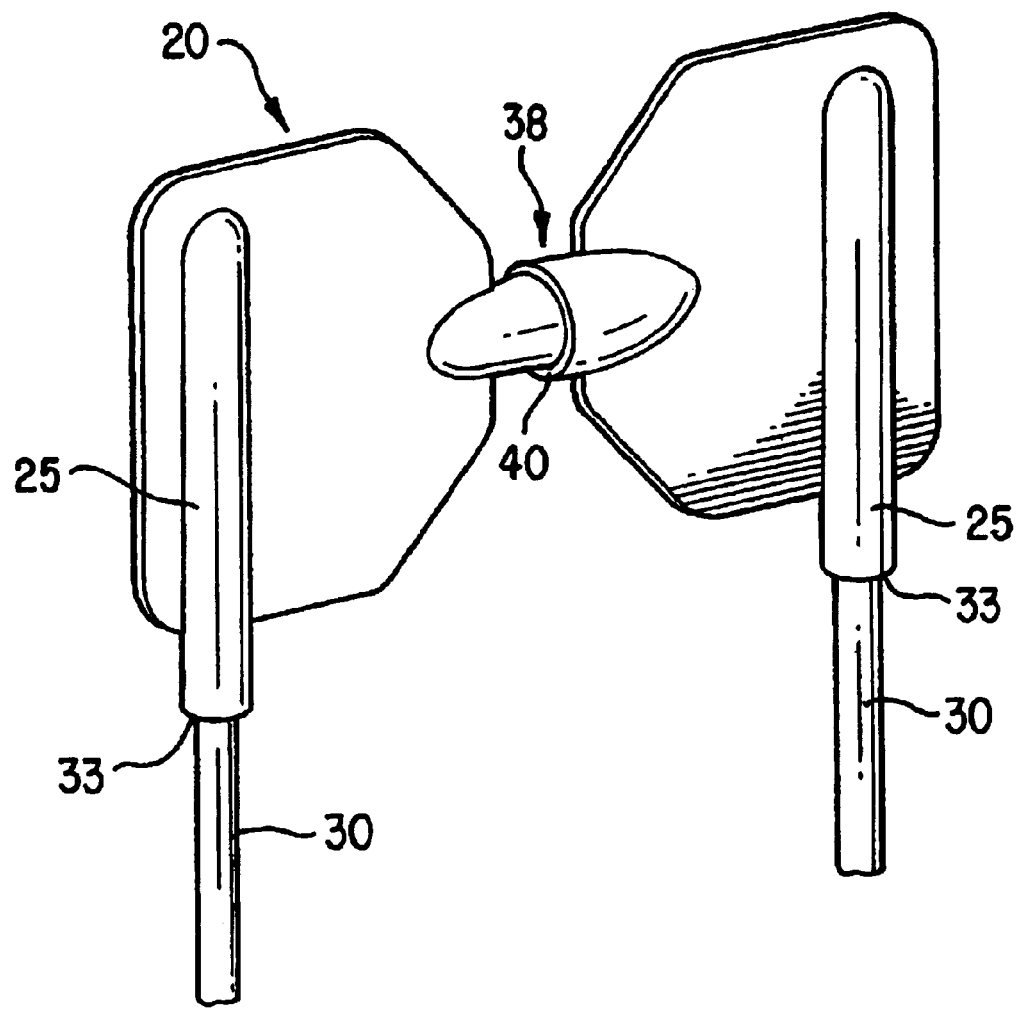
FIG. 3 is a perspective front view of a headrest insert according to one preferred embodiment of this invention.

According to another preferred embodiment of this invention, headrest insert 20 further comprises joint 40 positioned between the two receivers 25. As shown in FIG. 3, joint 40 may comprise a ball and socket joint or any other arrangement known to those having ordinary skill in the art that permits more than one axis of rotation between the two receivers 25.

Headrest having headrest insert 20 as described above may be connected with respect to a conventional seatback assembly having two independent guides positioned within two welded supports on the seat frame. Headrest insert 20 will self-adjust in the instance where the welded supports or the independent guides are misaligned with respect to one another. Alternatively, headrest insert 20 may be used in connection the headrest guide shown in FIGS. 4 and 6.

FIGS. 4 and 6 show headrest guide 50 for accepting two headrest rods 30. Headrest guide 50 preferably comprises two sleeves 55, each sleeve 55 forming a central channel 57. The diameter of central channels 57 preferably approximately correspond with the diameter of headrest rods 30 to permit smooth sliding engagement.

A plurality of rigid struts 60 preferably extend between the two sleeves 55 so that centerlines of each channel 57 are parallel with respect to one another. As a result of struts 60 extending between sleeves 55, headrest guide 50 preferably comprises a unitary molded component. Therefore, when one sleeve 55 is misaligned with respect to seat frame 70, the other sleeve 55 is correspondingly misaligned resulting in sleeves 55 aligning with each other.

According to one preferred embodiment of this invention, as shown in FIGS. 4 and 6, the plurality of rigid struts 60 comprise a first horizontal strut 60 positioned between a respective upper region of each sleeve 55 of the two sleeves 55; a second horizontal strut 60 positioned between a respective lower region of each sleeve 55 of the two sleeves 55; and two diagonal struts 60 positioned between the upper region and the lower region of each sleeve 55 of the two sleeves 55. This arrangement of struts 60, results in a strong, yet efficient, connection between sleeves 55 in headrest guide 50.

As shown in FIGS. 4 and 5, headrest guide 50 is connected to guide frame 75 that is further positioned within seat frame 70. Guide frame 75 is welded or otherwise affixed with respect to seat frame 70. Guide frame 75 preferably includes cavity 80 to permit insertion and/or attachment of headrest guide 50 to seat frame 70. Headrest guide 50 may be affixed to guide frame. 75 with one or more retaining clips 65 positioned with respect to an outer surface of the sleeve 55.

Headrest guide 50 may additionally comprise receptacle 63 positioned art within a top portion of each sleeve 55 for engaging headrest cap 68. Headrest cap 68 may be configured to permit fixing the horizontal position of the headrest, such as with a biased latch positioned within notches formed in the headrest rods 30.

While in the foregoing specification this invention has been described in relation to certain preferred embodiments thereof, and many details have been set forth for purpose of illustration, it will be apparent to those skilled in the art that the headrest assembly according to this invention is susceptible to additional embodiments and that certain of the details described herein can be varied considerably without departing from the basic principles of the invention.

I claim:

1. A headrest assembly for connecting a headrest with respect to a seat frame of a vehicle, the headrest assembly comprising:

a headrest guide having two, generally cylindrical sleeves, each of said sleeves forming a channel, the headrest guide being formed with the two cylindrical sleeves as a single, integrally molded, unitary component and the two sleeves being rigidly interconnected to each other adjacent upper and lower ends of said sleeves in a fixed parallel relationship with respect to one another by a plurality of rigid struts extending between the two sleeves so that the channel of each of said sleeves is parallel with the other;

a headrest insert; and two generally parallel rods, each of said rods fixed at one end with respect to the headrest insert and slidable at an opposite end with respect to one channel in the headrest guide.

2. The headrest assembly of claim 1 wherein the headrest guide is connected with respect to a seat frame of a vehicle.

3. The headrest assembly of claim 1 wherein the headrest insert tapers from each outer end of the insert toward a center portion of the insert.

4. A headrest assembly for connecting a headrest to a seat frame, the headrest assembly comprising:

a headrest guide attached to the seat frame and being formed with two generally cylindrical sleeves as a single, unitary molded component, said sleeves being rigidly interconnected to each other adjacent upper and lower ends of said sleeves in a fixed parallel relationship with one another by a plurality of rigid struts extending between the two sleeves, and each of said sleeves forming a channel wherein a centerline for each of said channels is parallel with respect to one another; and a headrest insert having two generally parallel rods, each of said rods fixed at one end with respect to the headrest and slidable at an opposite end with respect to the associated channel in the sleeves of the headrest guide, wherein each of the two sleeves further includes at least one retaining clip positioned with respect to an outer surface of the sleeve.

5. A headrest assembly for connecting a headrest to a seat frame, the headrest assembly comprising:

a headrest guide attached to the seat frame and being formed with two generally cylindrical sleeves as a single, unitary molded component, said sleeves being rigidly interconnected to each other adjacent upper and lower ends of said sleeves in a fixed parallel relationship with one another by a plurality of rigid struts extending between the two sleeves, and each of said sleeves forming a channel wherein a centerline for each of said channels is parallel with respect to one another; and a headrest insert having two generally parallel rods, each of said rods fixed at one end with respect to the headrest and slidable at an opposite end with respect to the associated channel in the sleeves of the headrest guide, wherein each of the two sleeves further comprises a receptacle positioned within a top portion of the sleeves, allowing the receptacle for engaging a headrest cap.

6. The headrest assembly of claim 5 wherein the headrest guide is connected to a guide frame that is further positioned within the seat frame.

7. The headrest assembly of claim 4 wherein the headrest guide is connected to a guide frame that is further positioned within the seat frame.

8. A headrest assembly for connecting a headrest to a seat frame, the headrest assembly comprising:

a headrest guide attached to the seat frame and forming a unitary molded component having two sleeves, a plurality of rigid struts extending between the two sleeves, each of said sleeves forming a channel wherein a centerline for each of said channels is parallel with respect to one another; and a headrest insert having two generally parallel rods, each of said rods fixed at one end with respect to the headrest insert and slidable at an opposite end with respect to the associated channel in the sleeves of the headrest guide, wherein the plurality of rigid struts comprise:

a first horizontal strut positioned between a respective upper region of each of the two sleeves;

a second horizontal strut positioned between a respective lower region of each of the two sleeves; and two diagonal struts positioned between the upper region and the lower region of each of the two sleeves.

9. A headrest assembly for connecting a headrest to a seat frame, the headrest assembly comprising:

a headrest guide attached to the seat frame and forming a unitary molded component having two sleeves, a plurality of rigid struts extending between the two sleeves, each of said sleeves forming a channel wherein a centerline for each of said channels is parallel with respect to one another; and a headrest insert having two generally parallel rods, each of said rods fixed at one end with respect to the headrest insert and slidable at an opposite end with respect to the associated channel in the sleeves of the headrest guide, wherein the plurality of rigid struts are integrally molded with respect to the two sleeves.

* * * * *